(12) United States Patent
Lundgren

(10) Patent No.: US 7,614,150 B2
(45) Date of Patent: *Nov. 10, 2009

(54) METHOD FOR MANUFACTURING A STATOR OR ROTOR COMPONENT

(75) Inventor: Jan Lundgren, Grundsund (SE)

(73) Assignee: Volvo Aero Corporation, Trollhattan (SE)

( * ) Notice: Subject to any disclaimer, the term of this patent is extended or adjusted under 35 U.S.C. 154(b) by 48 days.

This patent is subject to a terminal disclaimer.

(21) Appl. No.: 10/604,760

(22) Filed: Aug. 14, 2003

(65) Prior Publication Data

US 2004/0103533 A1 Jun. 3, 2004

Related U.S. Application Data

(60) Provisional application No. 60/402,946, filed on Aug. 14, 2002.

(51) Int. Cl.
*H02K 15/00* (2006.01)
*B21K 25/00* (2006.01)
(52) U.S. Cl. .................... 29/889.21; 29/596
(58) Field of Classification Search .......... 29/889.21, 29/889.22, 889.2, 889, 889.23, 890.01, 596; 310/259, 164
See application file for complete search history.

(56) References Cited

U.S. PATENT DOCUMENTS

| 1,641,745 | A | * | 9/1927 | Dimberg | 228/254 |
| 4,868,365 | A | * | 9/1989 | Farone et al. | 219/121.64 |
| 5,483,034 | A | * | 1/1996 | Havard et al. | 219/121.64 |
| 6,181,041 | B1 | * | 1/2001 | Nose | 310/164 |
| 6,321,448 | B1 |  | 11/2001 | Makino et al. | |
| 6,777,852 | B2 | * | 8/2004 | Ishikawa et al. | 310/259 |
| 7,200,933 | B2 | * | 4/2007 | Lundgren et al. | 29/889.22 |

FOREIGN PATENT DOCUMENTS

DE 3942051 A1 12/1989
EP 995673 A2 9/1999

* cited by examiner

*Primary Examiner*—John C Hong
(74) *Attorney, Agent, or Firm*—Novak Druce + Quigg LLP

(57) ABSTRACT

Method and arrangement for providing a stator or rotor component that is intended during operation to conduct a gas flow. A first wall part (14, 15) is placed with its one edge bearing against the flat side of a second wall part (9, 10), extending in the radial direction of the component, in such a way that the first wall part extends in the circumferential direction of the component. The edge of the first wall part is then laser-welded to the second wall part from an, in the circumferential direction, opposite side of the second wall part in relation to the first wall part in such a way that the joined-together portions of the wall parts form a T-shaped joint.

14 Claims, 4 Drawing Sheets

METHOD FOR MANUFACTURING A STATOR OR ROTOR COMPONENT

CROSS REFERENCE TO RELATED APPLICATIONS

The present application claims the benefit of U.S. Provisional Application No. 60/402,946 filed Aug. 14, 2002. Said application is expressly incorporated herein by reference in its entirety.

BACKGROUND OF INVENTION

1. Field of the Invention

The present invention relates to a method for manufacturing a stator or rotor component that is intended during operation to conduct a gas flow. The stator or rotor component can, for example, be used in a gas turbine and especially in a jet engine.

As used herein, jet engine is meant to include various types of engines that admit air at relatively low velocity, heat it by combustion and shoot it out at a much higher velocity. Included within the term jet engine are, for example, turbojet engines and turbo-fan engines.

A component of this kind, comprising (including, but not limited to) an outer and an inner ring with wall parts configured between the rings, can be arranged with a view to primarily being force-transmitting in the radial and axial direction. The wall parts can, for example, form hollow blades, which are usually shaped such that they offer as little air resistance as possible. The component can, for example, be arranged in a rear or front stand, or in an intermediate housing in a jet engine. The blades are often referred to in such a case as stays or "struts." Struts can, however, also be formed by other types of parts than hollow blades.

2. Background Art

Wall parts in the form of hollow blades are known that are arranged at a distance apart in the circumferential direction of the carrying component between an inner and an outer ring. The hollow blades are joined together with the rings by welding. Each of the rings is made in this case firstly with portions of the same cross-dimensional shape and size as the blades, protruding in the radial direction. Such protruding portions are often referred to as "stubs." Each of the blades are then welded to a protruding portion of this kind by means of a butt joint. The radially protruding portions are usually mill-cut from a ring. This is a time-consuming and costly operation.

SUMMARY OF INVENTION

One objective of the present invention is to achieve a method for manufacturing a stator or rotor component that creates, or establishes, preconditions for manufacture that is simplified and hence time-effective and cost-effective in relation to previous methods. Further, a high-strength component with long working life will be produced with the method. This objective is achieved by virtue of the fact that a first wall part is placed with its one edge bearing against the flat side of a second wall part, extending in the intended radial direction of the component, in such a way that the first wall part extends in the intended circumferential direction of the component. The edge of the first wall part is then laser-welded to the second wall part from an, in the circumferential direction, opposite side of the second wall part in relation to the first wall part in such a way that the joined-together portions of the wall parts form a T-shaped joint.

By the edge of the wall part, the elongated surface that delimits the side faces, or flat sides, of the wall part is meant. Given an appropriate choice of material parameters and welding parameters, a T-shaped joint with rounded corners, or at least a relatively smooth transition can be obtained between the wall parts. This produces a structurally strong construction and hence an extended working life. Alternatively, a construction with thinner wall thicknesses and hence reduced weight can be obtained.

According to a preferred embodiment of the invention, the first wall part is placed with a second edge, which is opposite to the first-named edge, bearing against the flat side of a further second wall part, which is arranged at a distance in the circumferential direction from the first-named second wall part and is connected thereto. Further, the two wall parts that are spaced apart in the circumferential direction are constituted by two different blades or stays for guidance of a gas flow and/or transmission of load. The first wall part thus serves to limit a gas duct in the radial direction between the two blades or stays.

According to a refinement of the previous embodiment, the two second wall parts are formed by a single, substantially U-shaped element. The two wall parts are constituted by a portion of the particular leg of the U.

Further preferred embodiments of, and advantages with, the invention can be ascertained from the claims, drawings, and following description.

BRIEF DESCRIPTION OF DRAWINGS

The invention will be described in greater detail below, with reference to the embodiments shown in the appended drawings, in which.

DETAILED DESCRIPTION

Figure 1:
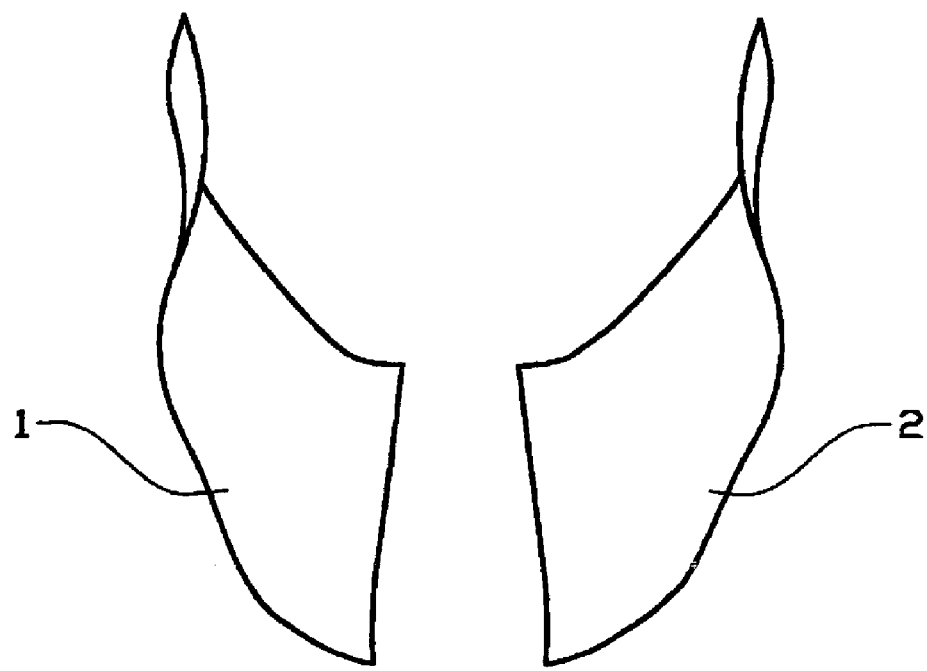
FIG. 1 shows a basic diagram of the connection between two wall parts forming part of the stator or rotor component according to the teachings of the present invention.

FIG. 1 shows a basic diagram of a connection of a first and second wall part 1, 2 forming part of a stator component. The axial direction, radial direction and circumferential direction of the component are marked in the Fig. with the arrows A, B, C.

The second wall part 2 is arranged firstly so that it extends essentially in the intended radial and axial direction A, B of the component. The first wall part 1 is placed with its one edge 3 bearing against the flat side 4 of the second wall part in such a way that the first wall part extends essentially in the circumferential direction C of the component and in its axial direction A. By the edge 3 of the first wall part 1 is thus meant the surface connecting its side faces, or flat sides.

Figure 2:
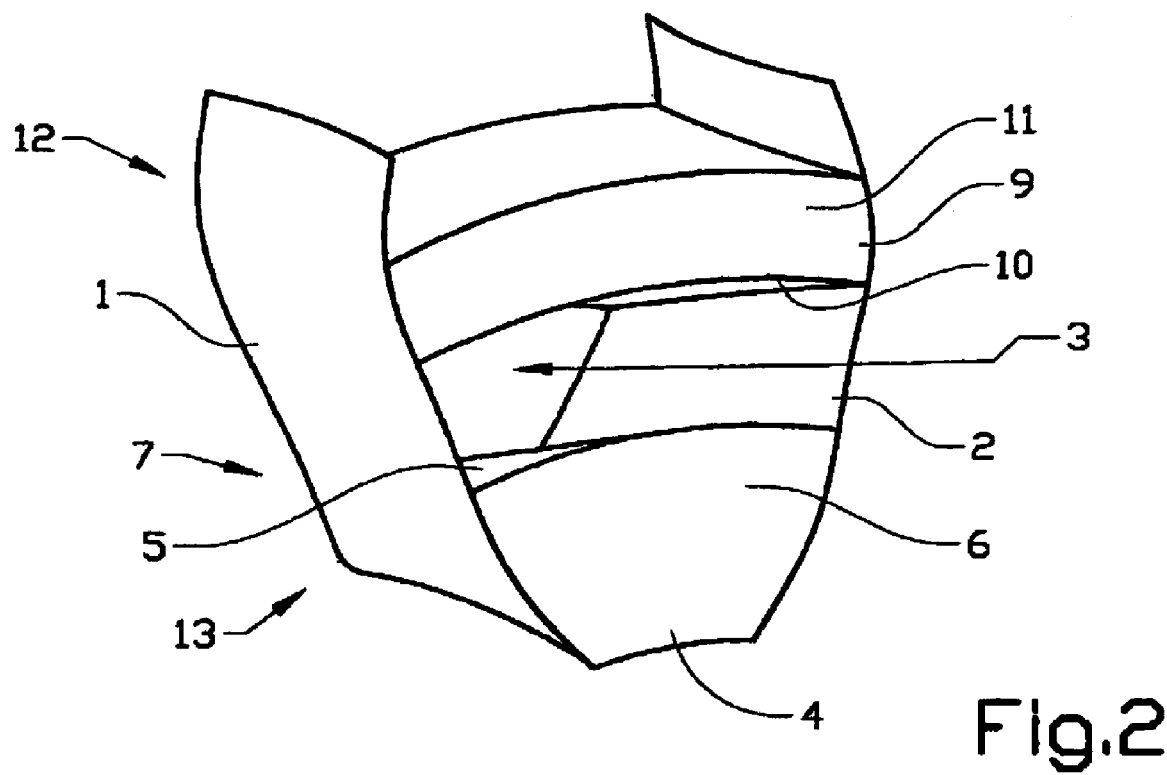
FIG. 2 shows an enlarged sectional view of a weld joint in the component shown in FIG. 1.

The edge 3 of the first wall part 1 is then laser-welded to the second wall part 2 from an, in the circumferential direction, opposite side of the second wall part 2 in relation to the first wall part 1 in such a way that the joined-together portions of the wall parts form a T-shaped joint 5 (see FIG. 2). The laser-welding is illustrated with the arrow D in FIG. 1.

Figure 3:
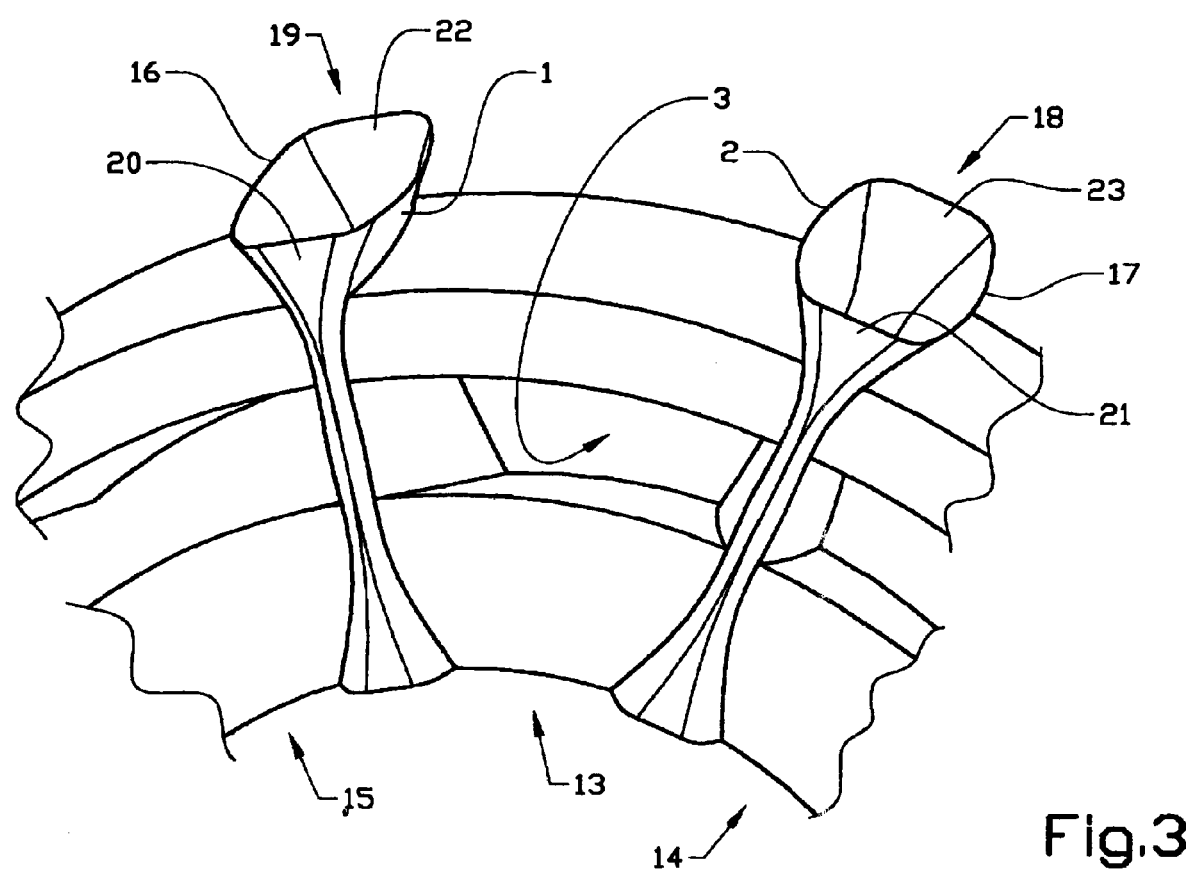
FIG. 3 shows a first preferred embodiment of a component in a cut projection.
Figure 4:
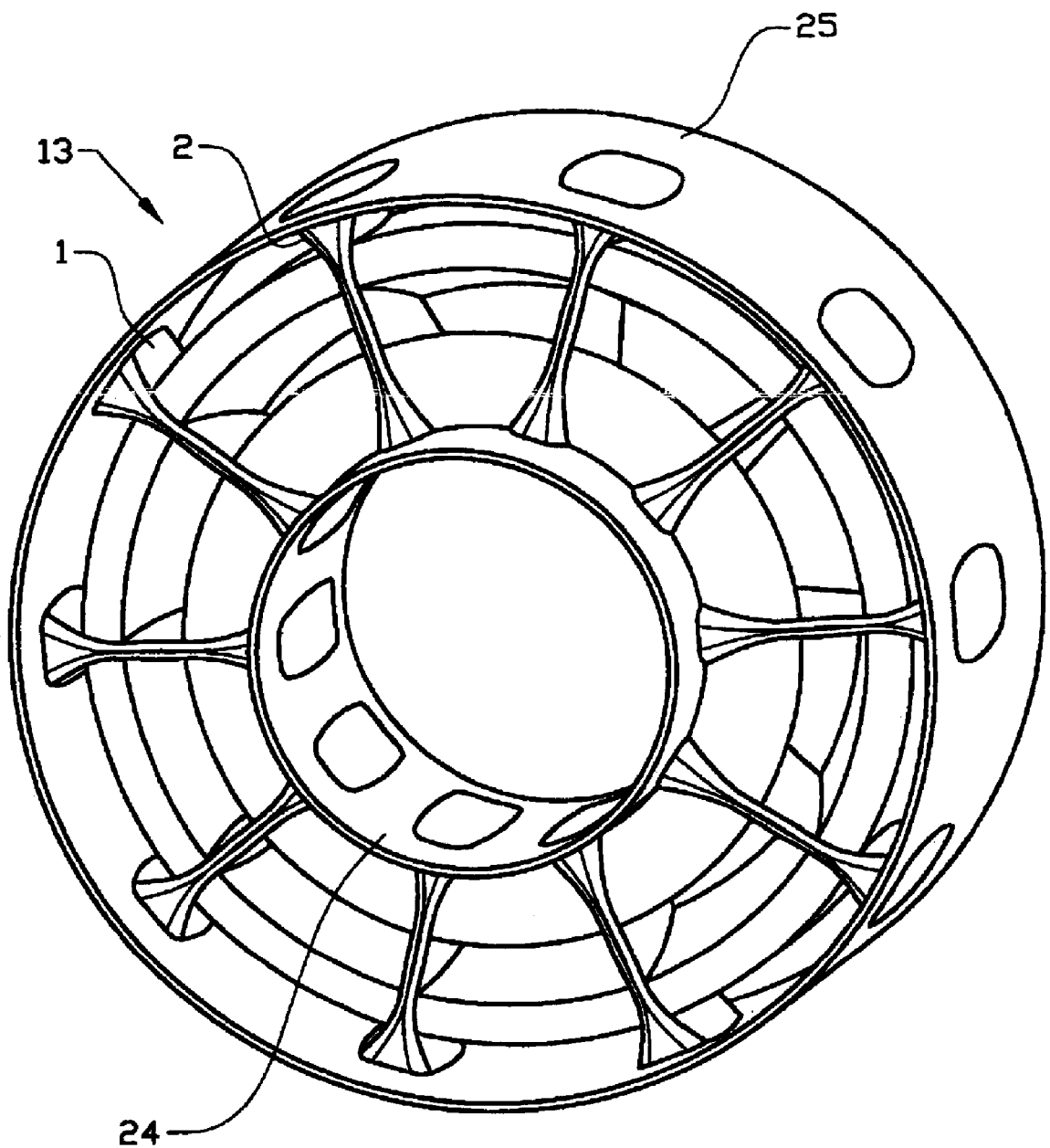
FIG. 4 shows a schematic projection of the component shown in FIG. 3.

By T-joint 5 it is meant, more precisely, that a portion of the second wall part 2 forms the top part of the T and a portion of FIGS. 3 and 4 show a first preferred embodiment of the component. Each of a plurality of essentially U-shaped elements 6, 17, 23 are connected to an inner ring element 7 and are placed adjacent to one another in the circumferential direction of the component. The one side member of the U-shaped element 6 forms a second wall part 9 and its other side member forms a further second wall part 10. The base of the U-shaped element 6 is connected to the inner ring element 7 by a rib 11, which extends in the intended axial direction of the component. The ends 12, 13 of the two side members are later connected to an outer ring element 8 (see FIG. 4). Each of the two second wall parts 9, 10 thus extend essentially in the radial and axial direction of the component. The U-shaped element can be made, for example, by curving or bending a plate or a sheet into the desired shape.

Further, two first wall parts 14, 15 are placed such that they extend in the circumferential direction of the component and at various distances apart in the radial direction between the two second wall parts 9, 10. More precisely, the two first wall parts 14, 15 are placed such that they bear with their end edges against the flat side of the second wall parts 9, 10. The end edges of the first wall parts 14, 15 are then laser-welded to the second wall parts 9, 10 from an, in the circumferential direction, opposite side of the second wall part 9, 10 in relation to the first wall part 14, 15. The laser-welding is realized in such a way that the joined-together portions of the wall parts 9, 10, 14, 15 form a T-shaped joint (see FIG. 2).

The first wall part 15 that limits a gas duct 20 inwardly in the radial direction forms an intermediate portion of a plate-shaped member. This plate-shaped member has a shape corresponding to the space between the second radial wall parts 9, 10 (see FIG. 3). The plate-shaped member has a U-shaped cross section and is constituted, for example, by a bent, or folded sheet. The side or plate portions 18 of the plate-shaped member have a shape and size corresponding to the space between the second wall parts 9, 10. The side portions of the plate-shaped member are expediently connected to the second wall parts 9, 10 by laser-welding.

The first wall part 14 that limits the gas duct 20 outwardly in the radial direction forms an intermediate portion of a further plate-shaped member. This plate-shaped member has a shape corresponding to the space between the second radial wall parts 9, 10 (see FIG. 3). The plate-shaped member also has a U-shaped cross section and is constituted, for example, by a bent, or folded sheet, or by a tube or other profile. The side or plate portions 19 of the plate-shaped member have a shape and size corresponding to the space between the second wall parts 9, 10. The side portions of the plate-shaped member, too, are connected to the second wall parts 9, 10 expediently by laser-welding.

Each of the side members of the U-shaped element 6 are connected to a side member 16 of an, in the circumferential direction, adjoining U-shaped element 17 in such a way that gas cannot flow between the side members (see FIG. 4). The mutually connected wall parts 9, 16 together form means for guidance of a gas flow and/or transmission of load in the radial direction during operation of the component.

The adjoining wall parts 9, 16 are connected in FIG. 4 by a front and a rear cover wall 24, which thus enclose a space between the wall parts. These cover walls 24 are aerodynamically configured and have, in this case, a pointed shape so as to offer as little flow resistance as possible. This connection can be produced, for example, by welding. The two connected side members together form a blade, vane, stay or strut for guidance of a gas flow and/or transmission of load. In other words, the two wall parts of the U-shaped element that are spaced apart in the circumferential direction form two different blades or stays for guidance of a gas flow and/or transmission of load.

FIG. 4 shows a schematic projection of a stator or rotor component 21 constructed according to the technique described above and illustrated in FIG. 3. The component 21 has an essentially circular cross-sectional shape and the ducts 20 for conduction of the gas flow extend in the axial direction between the inner ring, formed by the ring elements 7, and the outer ring 8.

Figure 5:
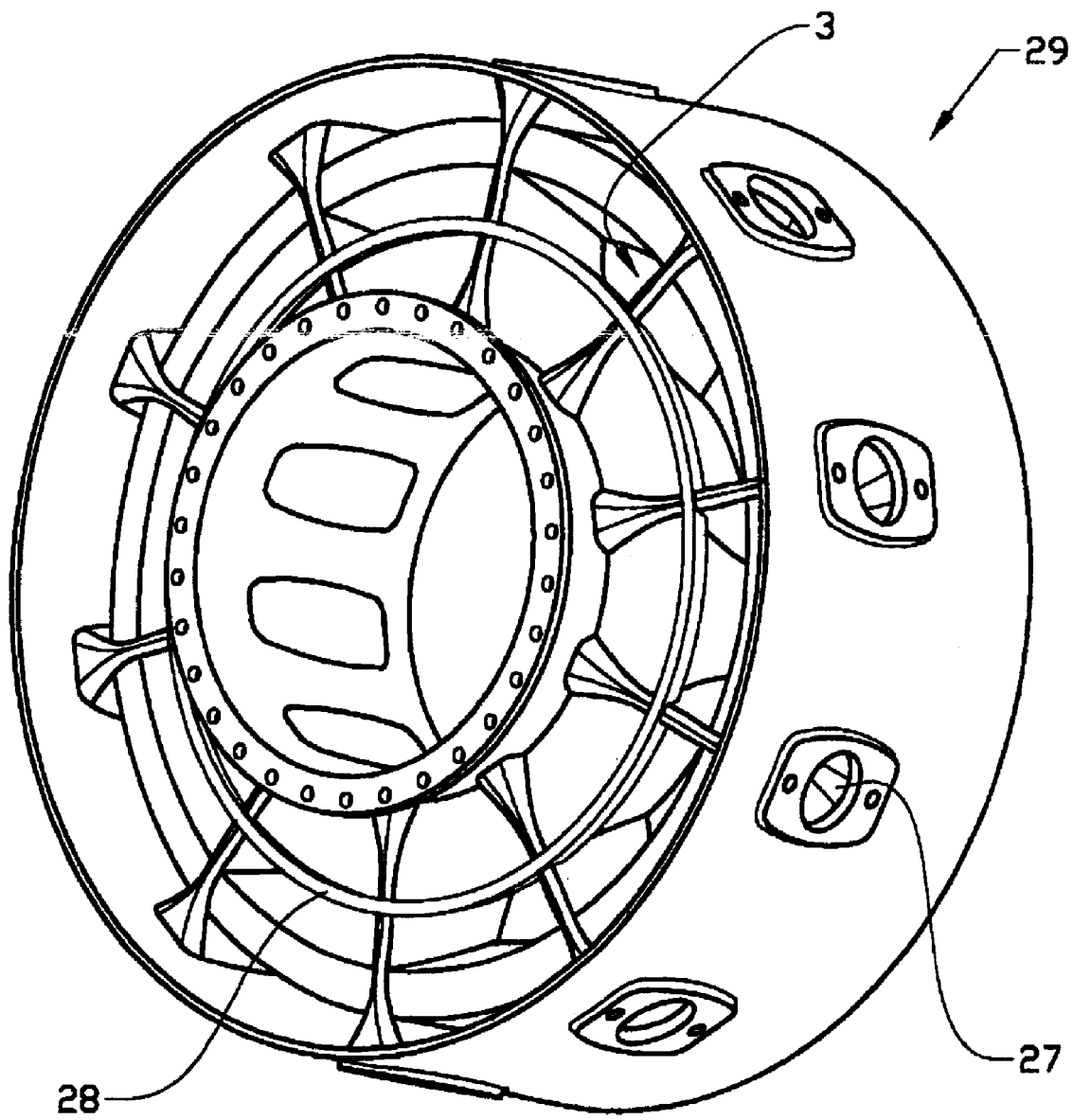
FIG. 5 shows a schematic projection of the component according to a second preferred embodiment.

FIG. 5 illustrates a second embodiment of the stator component 23. A basic difference relative to the first embodiment is that the two spaced apart second wall parts 109, 110 do not form part of a U-shaped element, but constitute separate units. All the wall parts 109, 110 in the component are first connected to a continuous inner ring 107. The first wall parts 114, 115 are connected to the second wall parts 109, 110 in the same manner as described above for the first embodiment. An outer ring 108 is then arranged around the wall parts 109, 110 and connected thereto.

The materials which are used for the first and second wall parts 1, 2, 9, 10, 14, 15, 109, 110, 114 are constituted by weldable materials such as stainless steel, for example of the type 347 or A286. Alternatively, nickel-based alloys, such as, for example, INCO600, INCO625, In the laser-welding, a Nd:YAG-laser is preferably used, but also other types of welding arrangements, for example a $CO_2$-laser, can be used according to the invention. By precise coordination of the welding method, materials choice and wall part dimensions, the T-shape in respect of a particular joint and a relatively gently rounded shape 22 of the inner angle between the second wall part and the first wall part are obtained with the laser-welding (see FIG. 2). The welding is expediently realized by means of a continuous weld. The rounded shape of the weld joints produces a high-strength construction and hence long working life for the component. This type of joining-together creates preconditions for a complete melting of the weld joint and fine transitions between the parts.

In order for the weld joint to end up in exactly the right position, a previously known joint-following technique can be used.

The wall part has the shape of a plate. By plate-shape, it is meant that the wall parts have two parallel side faces at a relatively short distance apart.

By use of the term ring element, a continuously annular member, a substantially annular member interrupted in the circumferential direction, or a part that, together with other like parts, is intended to form an annular member is meant. When a plurality of such ring elements are joined together in the circumferential direction, a ring is formed. Ring is used to mean a circumferential, band-shaped, preferably circular part that spreads like a plate in the axial direction.

Should the wall parts have the purpose of being load-transmitting or load-bearing in the radial direction, that is to say when they form so-called struts or stays, an airfoil shape is not always required, nor the shape of hollow blades, but rather the plate-shape can suffice. A plurality of different configurations are, however, possible.

Should the second wall parts have the purpose of guiding a gas flow during operation of the component, the mutually connected second wall parts form the shape of a blade, for example, having an airfoil shape in cross section. Such a blade shape is utilized when the component is used in specific stator applications.

The first wall part is not limited to just rounded or curved cross-sectional shape, but rather, for example, a square cross-sectional shape; that is to say, made up of essentially straight portions of different direction or orientations are also included.

By the expression that the wall parts extend in a certain direction or orientation with respect to the component is meant that at least one component of the extent of the wall part lies in this direction. Preferably, the wall part extends substantially in this direction. In other words, the wall part in question extends in a plane parallel with the direction.

The stator component can, for example, form an inlet part, an intermediate housing, or a turbine-exhaust housing; by exhaust housing, a concluding housing part, or part thereof for a gas turbine is meant. Its primary function in this case is to act as a bearing fastening, for the transmission of loads, and to provide a duct for gases.

By the expression that a wall part is placed such that it extends in the intended radial direction of the component, it is meant both that the wall part is placed directly in a structure in the radial direction of the component and that the wall part is first mounted in a section and that a plurality of such sections are then mutually connected in the circumferential direction so that the wall part ends up in the radial direction. The equivalent applies to when a wall part is placed so that it extends in the intended axial direction of the component and in its circumferential direction.

The invention will not be deemed limited to the illustrative embodiments described above, but a host of further variants and modifications are conceivable within the scope of the subsequent patent claims.

The connection of a wall part extending in the radial direction to another wall part extending in the radial direction can further be affected differently than arranging a cover plate therebetween. For example, the wall parts can be arranged relatively close together and connected by the application of material, for example, by welding. Further, the cover plates can be fixed in a number of different of ways, such as riveting and gluing.

It is further conceivable for a plurality of separate sections to be made, each comprising a first and a second wall part, and which sections each in cross section form a sector of a circle. The sections are then connected in the intended circumferential direction of the component to form the stator or rotor component. In other words, in the construction of the section, the second wall part is arranged in the intended radial direction of the component and the first wall part in the intended circumferential direction of the component. When a plurality of such sections are put together, the second wall part thus ends up such that it extends in the radial direction of the component and the first wall part ends up such that it extends in the circumferential direction of the component.

The invention claimed is:

1. A method for manufacturing a generally ring-shaped stator or rotor component which is intended during operation to conduct a gas flow, comprising:
   constructing a portion of said stator or rotor component by steps including 1) providing a curved first wall part having one edge bearing against a flat side of a second wall part that extends in a direction corresponding to an eventual radial direction of the component in such a way that the first wall part extends and curves in a direction corresponding to an eventual circumferential direction of the component and also extends in a direction corresponding to an eventual axial direction of the component; and 2) laser-welding the edge of the first wall part to the second wall part from an, in the circumferential direction, opposite side of the second wall part in relation to the first wall part in such a way that the joined-together portions of the wall parts form a T-shaped joint;
   wherein a sufficient number of stator or rotor component portions are so constructed and are mutually arranged so as to form the stator or rotor component, with the curved first wall parts of the stator or rotor components defining an axially extending, substantially annular flow-guiding surface that delimits a gas duct in said eventual radial direction.

2. The method as recited in claim 1, wherein the first wall part of said stator or rotor component portion abuts the flat side of the second wall part in generally perpendicular fashion.

3. The method as recited in claim 1, wherein the second wall part of said stator or rotor component portion is arranged such that it also extends in the direction corresponding to the eventual axial direction of the component.

4. The method as recited in claim 1, wherein the second wall part, extending in the direction corresponding to the eventual radial direction of the stator or rotor component, is arranged so as to circumferentially limit said gas duct in the direction corresponding to the eventual circumferential direction of the component.

5. The method as recited in claim 1, wherein the second wall part is arranged such that it has an essentially radial widening for guidance of the gas flow and/or transmission of load during operation of the component.

6. The method as recited in claim 1, wherein the first wall part is placed with a second edge, which is opposite to the first-named edge, bearing against the flat side of a further second wall part, which is arranged at a distance in the circumferential direction from the first-named second wall part, and is connected thereto.

7. The method as recited in claim 6, wherein the second edge of the first wall part is also laser-welded to this further second wall part from an, in the circumferential direction, opposite side of the second wall part in relation to the first wall part in such a way that the joined-together portions of the wall parts form a T-shaped joint.

8. The method as recited in claim 6, wherein the two second wall parts which are spaced apart in the circumferential direction constitute at least part of two different blades or stays for guidance of a gas flow and/or transmission of load.

9. The method as recited in claim 6, wherein the two second wall parts are formed by a single, substantially U-shaped element.

10. The method as recited in claim 9, wherein the first and second wall part are arranged between an, in the radial direction, inner and outer ring element and the U-shaped element, prior to the laser-welding of the wall parts, is arranged between the inner ring element and the outer ring element.

11. The method as recited in claim 1, wherein the first and second wall part are arranged between an, in the radial direction, inner and outer ring element.

12. The method as recited in claim 11, wherein the second wall part is connected to at least one of the ring elements by laser-welding from an, in the radial direction, opposite side of the ring element in relation to the second wall part in such a way that the joined-together portions form a T-shaped joint.

13. The method as recited in claim 1, wherein the stator or rotor component is intended for a gas turbine.

14. The method as recited in claim 1, wherein the stator or rotor component is intended for a jet engine.

* * * * *